United States Patent [19]

Pegoraro

[11] Patent Number: 4,629,007
[45] Date of Patent: Dec. 16, 1986

[54] ROTARY BLADE AGRICULTURAL IMPLEMENT

[75] Inventor: Luciano Pegoraro, Gambellara, Italy

[73] Assignee: Pegoraro S.p.A., Gambellara, Italy

[21] Appl. No.: 701,749

[22] Filed: Feb. 14, 1985

[30] Foreign Application Priority Data

Feb. 17, 1984 [IT] Italy .................. 12431 A/84

[51] Int. Cl.⁴ .................. A01B 33/10; A01B 33/02
[52] U.S. Cl. .................. 172/548; 172/556
[58] Field of Search .............. 172/548, 556, 543, 753, 172/123, 707, 708, 45, 60, 118, 119, 120, 540, 531, 544, 545, 549, 550

[56] References Cited

U.S. PATENT DOCUMENTS

| | | | |
|---|---|---|---|
| 967,189 | 8/1910 | Hanson | 172/549 |
| 1,362,527 | 12/1920 | Cook | 172/550 |
| 1,497,144 | 6/1924 | Jackson | 172/753 X |
| 2,749,827 | 6/1956 | Harfert | 172/549 |
| 3,233,686 | 2/1966 | Steadman | 172/556 |
| 3,589,452 | 6/1971 | Haker | 172/548 |
| 3,760,884 | 9/1973 | Webster | 172/60 |
| 4,133,390 | 1/1979 | Reaume | 172/548 |

Primary Examiner—Richard J. Johnson
Attorney, Agent, or Firm—Larson and Taylor

[57] ABSTRACT

The invention relates to an agricultural implement provided with rotary blades (3) which are secured in a changeable manner to at least one blade-carrying flange (2) of a shaft (1). In order to reduce the work and the time for changing the blades, each blade (3) which adheres against one side of the blade-carrying flange (2) is secured to same by means of one single locking bolt (5, 6) and presents a locking shank (203) which passes through a corresponding opening (4) of the blade-carrying flange (2) and adheres against the other side of same.

11 Claims, 13 Drawing Figures

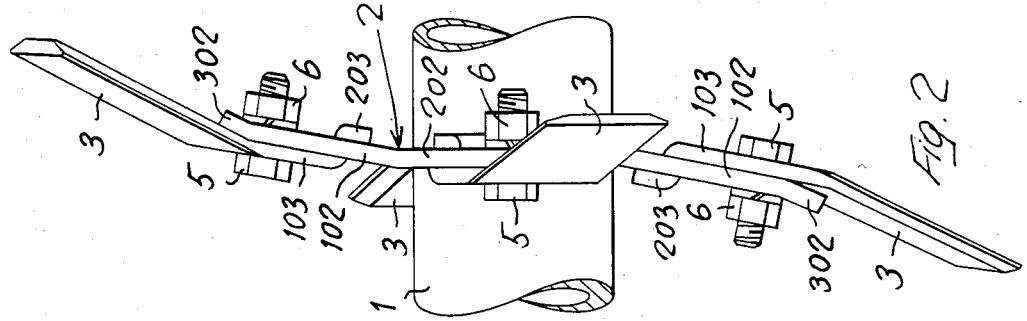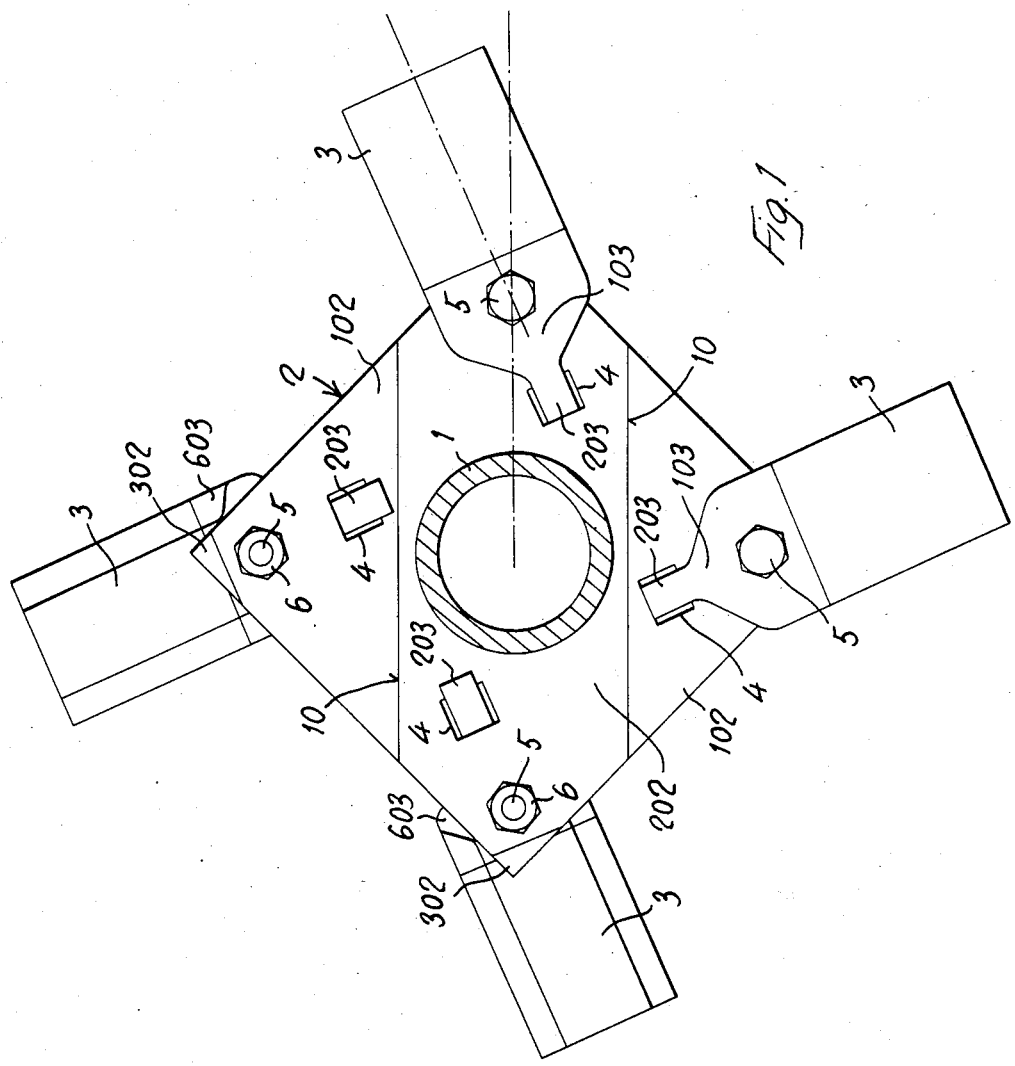

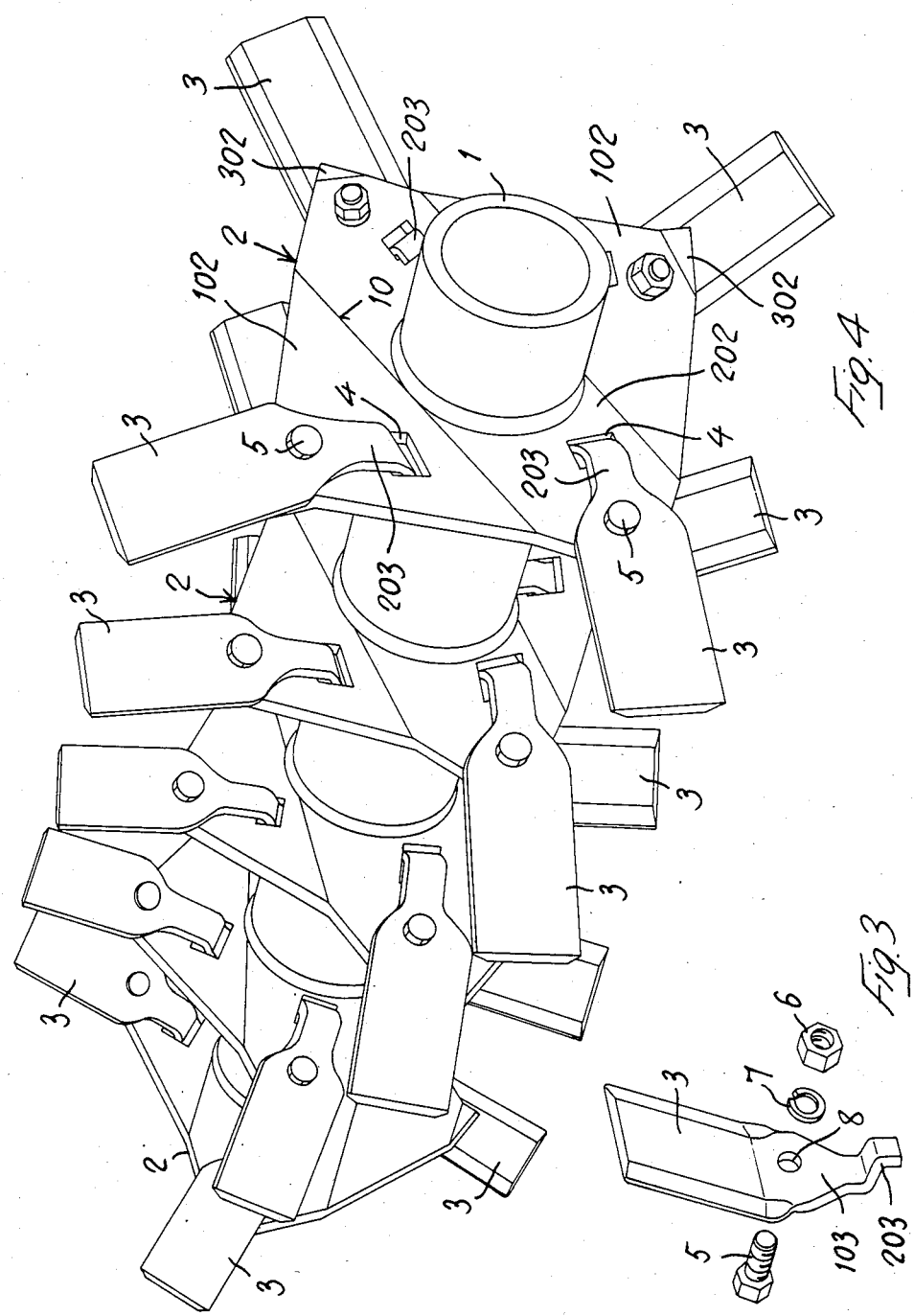

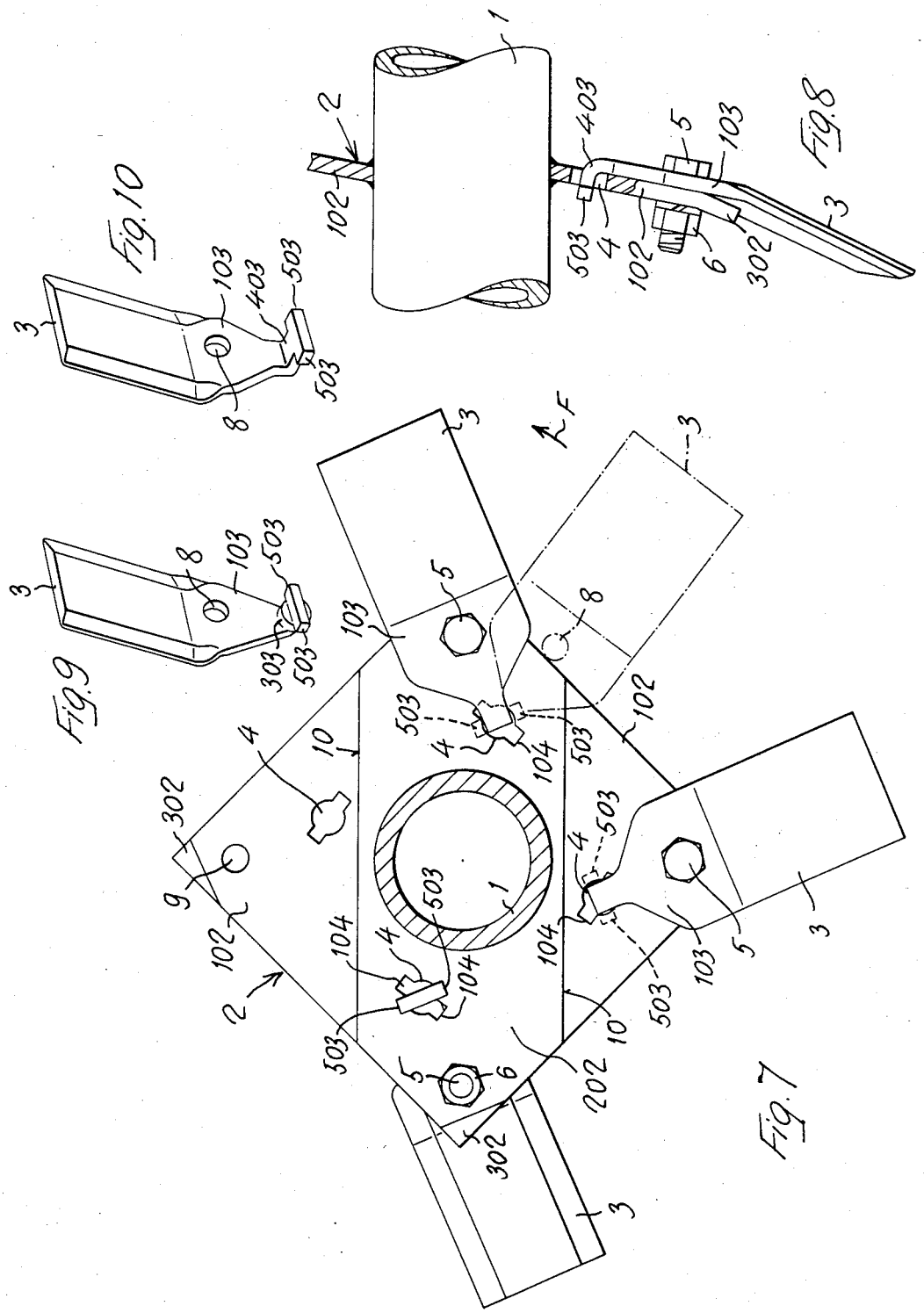

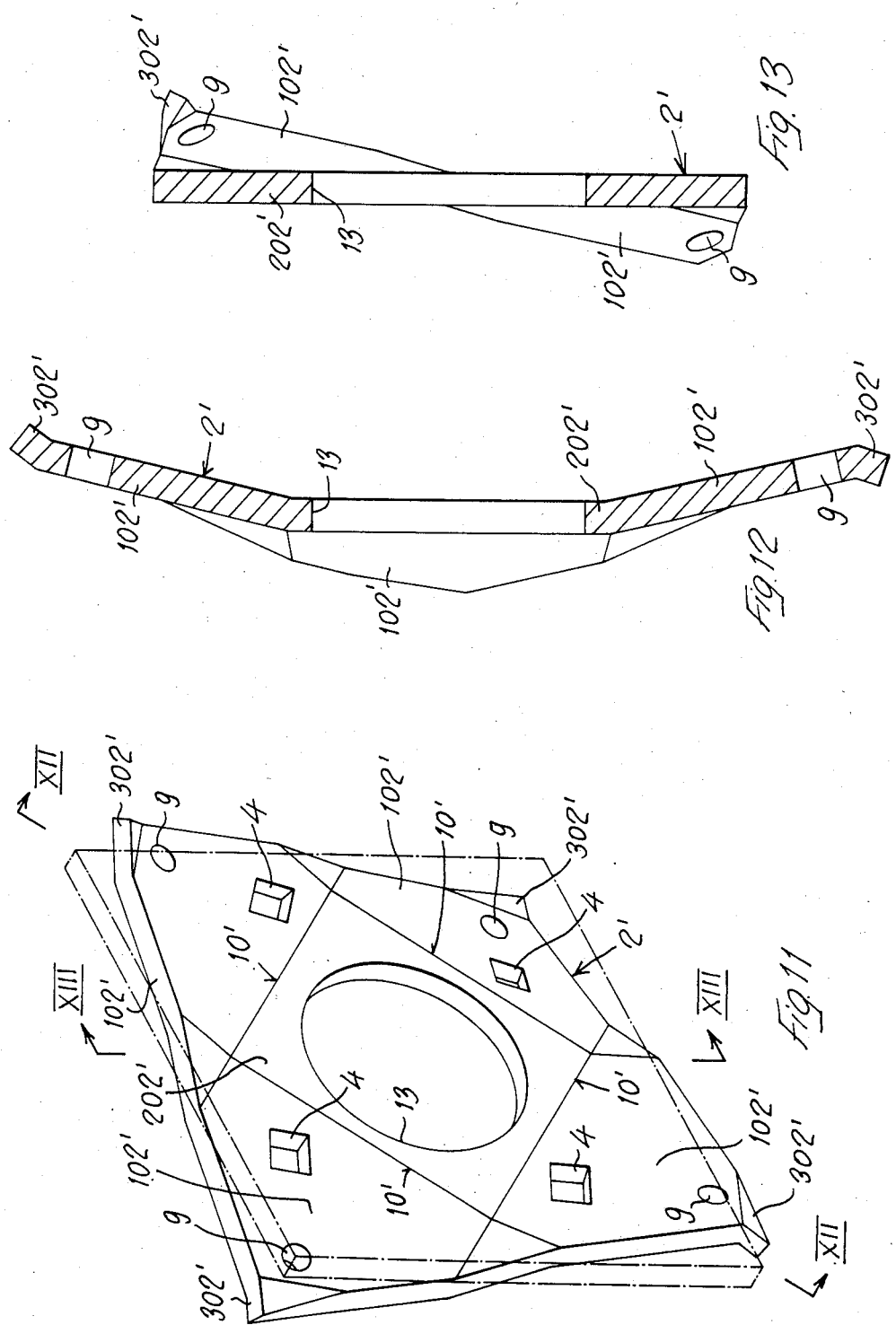

ROTARY BLADE AGRICULTURAL IMPLEMENT

BACKGROUND AND SUMMARY OF THE INVENTION

The invention has for its object an agricultural implement provided with rotary blades which are secured in a changeable manner to at least one blade-carrying flange of a shaft.

In the known agricultural implements of this type, particularly rotary cultivators or the like, presenting a horizontal shaft provided with a plurality of blade-carrying flanges and driven into rotation, each blade is secured to the respective blade-carrying flange by means of two bolts. Consequently the operation of changing a blade required a fairly long and tiring work, since it was necessary to remove two bolts which, in consideration of their working conditions, cannot be unscrewed easily. By keeping moreover in mind that the blades frequently break and/or get worn rapidly, so that they must be frequently changed, it appears evident that the securing of same onto the blade-carrying flange by means of two bolts causes a considerable loss of time and requires a remarkable work.

The invention has for its purpose to eliminate the above mentioned inconveniences and to provide an agricultural implement of the aforementioned type in which the blades can be mounted and dismounted and consequently changed more easily and more quickly. Moreover, the invention aims to increase the width of the strip of soil worked by the blades of each blade-carrying flange, by adopting a simple and economical construction of the said blade-carrying flange.

This problem is solved by the invention due to the fact that each blade, adhering onto one side of the blade-carrying flange, is secured to same by means of one single locking bolt and it presents a locking shank which passes through a corresponding opening in the blade-carrying flange, and adheres against the other side of same.

In this manner, according to the invention, in order to change each blade it is necessary to dismount and to mount just one single bolt, so that the work and the time which are required are practically reduced by half with respect to what was necessary up to now, since the other operations for effecting the change simply consist in disinserting and inserting the blade locking shank from and into the corresponding opening in the blade-carrying flange and therefore can be effected very easily and quickly.

The locking shank of the blade may be constructed in different manners. According to a first embodiment of the invention, the said locking shank extends in the longitudinal direction of the blade and is crank-shaped so as to get hooked by its end to the edge of the opening provided in the blade-carrying flange and opposite to the blade. In this case, the blade is engaged by its locking shank in the corresponding opening of the blade-carrying flange by means of angular movements which are substantially perpendicular to the flange surface, in order to insert the crank-shaped locking shank through the opening of the blade-carrying flange and to hook it to the edge of the opening of the said flange.

According to another embodiment of the invention, the locking shank of the blade and the corresponding opening are constructed in such a manner as to realize a bayonet joint. In this case particularly the locking shank extends towards the surface of the blade-carrying flange through the opening of same and presents at its end a head consisting of at least one transverse locking tooth which projects out laterally, while the corresponding opening in the blade-carrying flange presents at least a recess which consents the passge of the said locking tooth but it is angularly offset with respect to the position which this latter assumes when the blade is secured by means of the bolt to the blade-carrying flange. According to this embodiment the blade is engaged by its locking shank into the corresponding opening of the blade-carrying flange by means of angular movements substantially parallel to the surface of the blade-carrying flange, firstly in order to make the locking tooth of the shank of the blade coincide with the corresponding recess of the opening of the blade-carrying flange and thereafter in order to offset said tooth, after being passed through the opening of the blade-carrying flange, with respect to the enlarged recess of the said opening, so as to engage the said locking tooth with the other side of the said blade-carrying flange.

Further advantageous features and preferred embodiments of the invention will result from the dependent claims.

BRIEF DESCRIPTION OF THE DRAWINGS

Some embodiments of the invention are illustrated in the attached drawings, in which:

FIG. 1 is a transverse section of an agricultural implement provided with rotary blades, in accordance with the invention.

FIG. 2 shows in side elevation a blade-carrying flange with the respective blades, of the agricultural implement according to FIG. 1.

FIG. 3 shows in perspective view a single blade of the agricultural implement according to FIGS. 1 and 2.

FIG. 4 shows in perspective view the shaft with the blade-carrying flanges and the blades of an agricultural implement according to FIGS. 1 to 3.

FIG. 7 shows in transverse section another embodiment of the agricultural implement according to the invention.

FIG. 8 is a partial view in side elevation of a blade-carrying flange of the implement according to FIG. 7.

FIGS. 9 and 10 show in perspective view two embodiments of blades which can be used in the implement according to FIGS. 7 and 8.

FIG. 11 shows in perspective view another particular embodiment of the blade-carrying flange.

FIGS. 12 and 13 show the blade-carrying flange in section along lines XII—XII and XIII—XIII of FIG. 11.

DESCRIPTION OF THE PREFERRED EMBODIMENTS

Figure 6:
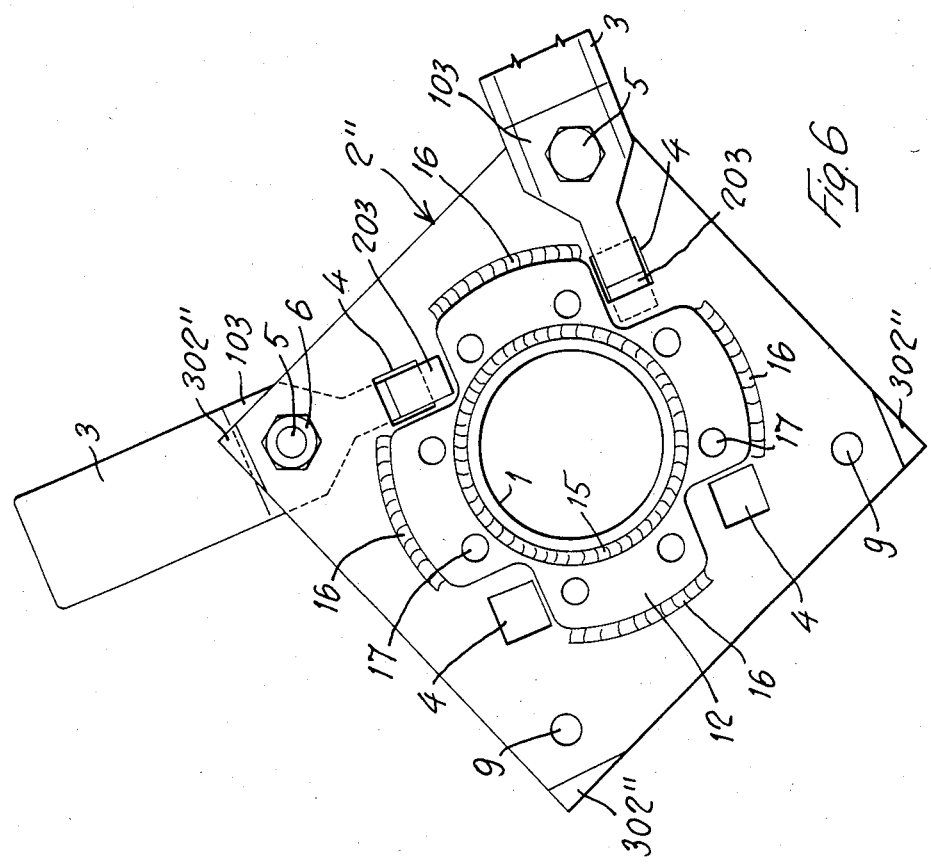
FIGS. 5 and 6 show in side elevation and in front view one end of the shaft of the agricultural implement according to FIGS. 1 to 4.

In the embodiment of FIGS. 1 to 6, reference numeral 1 denotes the norizontal tubular shaft of an agricultural implement for working the soil by means of rotary blades. More particularly shaft 1 may be the shaft of a rotary cultivator. Onto shaft 1 there are secured, and more particularly welded, the blade-carrying flanges 2, spaced between one another. To each blade-carrying flange 2 there are secured in a removable manner the blades 3 which are directed substantially radially or tangentially to shaft 1 or at a certain angle with respect to the radial direction, and which project peripherally from the respective blade-carrying flange 2. Each blade 3 adheres against the respective blade-carrying flange 2 by means of a corresponding flat base portion 103 from which there extends towards the shaft 1 a locking shank 203 consisting of a tapered appendix of the blade 3 itself. The said locking shank 203 is crank-shaped and is passed through a corresponding opening 4 in the blade-carrying flange 2, so as to adhere and to get hooked by its end to the end of the opening 4 opposite to blade 3, that is so as to adhere with said end against the side of the blade-carrying flange which is opposite to the side against which the blade 3 itself adheres. The blade 3 is thus hooked by its locking shank 203 to the blade-carrying flange 2 and it is secured to the said flange, at the base portion 103 of the blade 3, by means of one one single bolt 5 with respective nut 6 and spring washer 7. The locking shank 203 of blank 3 presents longitudinal side edges which are parallel to each other, while the corresponding opening 4 in the blade-carrying flange 2 is substantially rectangular.

Also in the embodiment according to FIGS. 7 and 8, in which like numerals indicate like parts, each blade 3 is secured to the respective blade-carrying flange 2 by means of one single bolt 5 and of a locking shank 203 or 403 which is engaged in a corresponding opening 4 obtained in the blade-carrying flange 2. In this case, however, the locking shank 303 or 403 of each blade 3 consists of a stem which extends from the blade 3 towards the surface of the blade-carrying flange 2 and passes through a corresponding opening 4 obtained in the said flange. At its free end, the locking shank 303 or 403 presents a head consisting of two transverse locking teeth 503 which are diametrally opposite and projecting laterally, and which adhere against the side of the blade-carrying flange 2 opposite to the side onto which there adheres the respective blade 3. The opening of the blade-carrying flange 2, corresponding to the locking shank 303 or 403 of each blade 3, comprises a central portion 4, through which there passes only the stem of the locking shank, and which presents two extensions or recesses 104 diametrally opposed, through which there may pass the lateral locking teeth 503 of the head of the locking shank 303 or 403 itself. The said two recesses 104 are however angularly offset with respect to the position which the lateral locking teeth 503 of the locking shank 303 or 403 of the blade 3 assume in the locking position of blade 3 to the blade-carrying flange 2. In this manner, there is obtained a bayonet connection between the locking shank 303 or 403 of blade 3 and the blade-carrying flange 2. In order to mount the blade, this latter is kept at an angular position such that the two lateral locking teeth 503 of its locking shank 303 or 403 come to coincide with the corresponding recesses 104 of the opening 4 and can be therefore inserted through said recesses 104 so as to pass to the opposite side of the blade-carrying flange 2, as shown by dash-and-dot lines in FIG. 7. Subsequently, the blade 3 is rotated by its locking shank 303 or 403 at the interior of opening 4 parallelly to the surface of the blade-carrying flange 2, for example in the direction of arrow F of FIG. 7, so as to be brought to its final mounting position, in which the lateral locking teeth 503 of the locking shank 303 or 403 come to be angularly offset with respect to the recessed portions 104 of the opening 4 and get hooked to the edges of said opening 4 on the side of the blade-carrying flange 2 opposite to the blade 3 itself, as shown by full lines in FIG. 7. In this mounting position, the blade 3 is secured to the blade-carrying flange 2 by means of one single bolt 5 with a respective nut 6 in the zone of the base portion 103 of the blade 3 itself. The dismounting of the blade 3 is effected in the contrary manner.

The differnce between the two blades shown in FIGS. 9 and 10 resides in the fact that the locking shank 303 provided with head consisting of two diametrally opposed locking teeth 503 of blade 3, according to FIG. 9, is obtained by means of forging, while the locking shank 403 provided with head consisting of two diametrally opposed locking teeth 503, according to FIG. 10, is obtained by means of shaping and bending of the respective end portion of the blade.

In all the shown embodiments, the blades 3 can be made in any suitable manner. Preferably, both longitudinal side edges of the blades are sharpened. Moreover, the active portion of blades 3, which projects peripherally from the blade-carrying flange 2, is slightly bent with respect to the base portion 103 which adheres against the blade-carrying flange 2 and it can be either flat or even curved, as illustrated in the case of blade 3 of FIG. 5. The displacement of blades 3 parallelly to the blade-carrying flange 2 around the respective locking bolt 5 is avoided by the abutment of the locking shank 203, 303, 403 of the blade against the side edges of the respective opening 4 in the blade-carrying flange 2. In order to obtain a stronger locking in this direction, and a more accurate positioning of the blades 3 in their working position, each blade 3 may be provided with a projecting portion 603 which bears against the edge of the blade-carrying flange 2, as shown in FIG. 1. In FIGS. 1, 9 and 10, reference numeral 8 indicates the bore in blade 3 for the locking bolt 5, while in FIGS. 6, 7, 11, 12 and 13 reference numerals 9 indicate the bores provided in the blade-carrying flange for the locking bolts 5.

Figure 5:
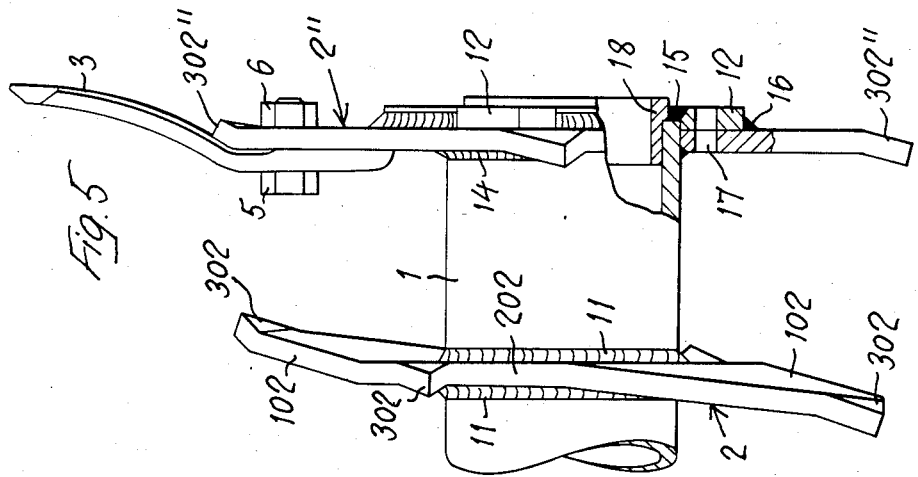

The blade-carrying flanges 2, onto which the blades 3 are secured in the above mentioned manner, may be constructed in any suitable manner and can be flat and perpendicular to the axis of the respective shaft 1 or inclined with respect to same. Preferably, however, each blade-carrying flange 2 presents some portions which form different angles with respect to the axis of shaft 1 and carry each at least one blade 3, with the purpose of increasing the width of the strip of soil worked by the blades of a blade-carrying flange. Thus, for example, in the embodiments according to FIGS. 1 to 8, each blade-carrying flange 2 (with the exception of the terminal blade-carrying flanges 2" provided at the ends of shaft 1) consists of a square plate, of which two angular portions 102 diagonally opposed are slightly bent in opposite directions with respect to the interposed central portion 202, along two lines 10 which are parallel to each other and to the diagonal corresponding to the other two angles of the plate. This blade-carrying flange 2 is secured onto shaft 1 with its median flat and diagonal portion 202 directed perpendicularly to shaft 1 itself. For this purpose, the median portion 202 of the blade-carrying flange 2 presents preferably a suitable bore, by means of which it is inserted onto the shaft 1, onto which it is secured by means of welding 11, as shown in FIG. 5. At each angle of this blade-carrying flange 2 there is mounted a blade 3. The blades 3 provided at the two angles of the median portion 202 perpendicular to shaft 1, are arranged on opposite sides of the blade-carrying flange 2. In a similar manner, also the blades 3 provided at the bent angular portions 102 are arranged on opposite sides of the blade-carrying flange 2. In this manner, the width of the soil strip worked by the blades 3 of a blade-carrying flange 2 corresponds substantially to the distance between the circles described by the free ends of the two blades 3 secured to the bent angular portions 2 of the blade-carrying flange 2. These blades work the respective marginal zones of the said strip, while the median zone of said strip is worked by the two blades 3 secured at the angles of the diagonal median portion 202 of the blade-carrying flange 2. It appears evident that by means of these simple constructive arrangements, that is by adapting a different inclination of various portions of the blade-carrying flange 2 and be arranging the blades 3 on opposite sides of said blade-carrying flange 2, there is obtained a very ample width of the soil strip which is worked by the blades 3 of each blade-carrying flange 2, together with a great uniformity of work on said strip.

An even more advantageous effect than the one above mentioned is obtained by the embodiment of the blade-carrying flange 2' according to FIGS. 11 to 13. In this case, the four angle portions 102' of a square plate which is initially flat, shown by dash-and-dot lines in FIG. 11, are alternately bent in opposite directions out of the plane of the original flat plat along the lines 10'. In this manner a blade-carrying flange 2' is obtained of which two diagonally opposed angular portions 102' are slightly bent the one towards the other on one side of the blade-carrying flange 2', while the other two diagonally opposed angular portions 102' are slightly bent the one towards the other on the other side of the blade-carrying flange 2'. Also in this case the blades (not shown) are secured to the blade-carrying flange 2' at the angles of same, that is each one on one of the bent angular portions 102'. In FIGS. 11 to 13 there are shown just the bores 9 for the locking bolts 5 and the openings 4 for the locking shanks of the blades. The central portion 202' of the blade-carrying flange 2' is provided with a bore 13 for mounting the flange 2' onto shaft 1.

At one end at least of shaft 1, particularly at the end connected to the driving unit for the shaft itself, there is preferably arranged a flat terminal blade-carrying flange 2" which is perpendicular to shaft 1 and is secured to same for example by means of welding 14. On the outer side of this terminal blade-carrying flange 2" there is provided a reinforcing flange 12, secured to the head end of shaft 1 by means of welding 15. This reinforcing flange 12 presents a four-lobed shape or in any case it is provided with recesses for giving space to the openings 4 of the blade-carrying flange 2" for the insertion of the locking shanks 203 of blades 3. The reinforcing flange 12 is secured also to the blade-carrying flange 2" by means of welding 16. In the terminal blade-carrying flange 2" and in the reinforcing flange 12 there are provided bores 17 for coupling the shaft 1 to the respective driving member (not shown). The end of shaft 1 is reinforced by means of an inner tube 18.

In all cases, in which blades 3 are slightly bent with respect to their base portion 103 and are fixed at the angles of a polygonal blade-carrying flange 2, 2', 2", for example of triangular, square, pentagonal or the like shape, the corresponding angle portion 302, 302', 302" of the blade-carrying flange 2, 2', 2" is bent in such a manner to result parallel to the blade 3 and to serve as support for said blade.

I claim:

1. In agricultural implement suitable for use in a rotary cultivator, said implement comprising a plurality of blades fastened in a changeable manner to a blade-mounting plate secured to a rotatable shaft, the improvement wherein said blade-mounting plate comprises a plurality of blade fastening portions, at least one said blade fastening portions being inclined with respect to the axis of said rotatable shaft, each of said blade fastening portions of said blade-mounting plate being each provided with a locking opening, and wherein each of said blades is provided with a locking shank which is adapted to be inserted through said locking opening provided in the corresponding blade fastening portion of said plate, said blades and said blade fastening portions of said plate being further provided with a through hole for passage of a single bolt for securing each blade to said plate.

2. An implement according to claim 1, wherein said locking shank extends in the longitudinal direction of the blade and is crank-shaped, whereby its end is adapted to engage the edge of said locking opening.

3. An implement according to claim 2, wherein said locking shank extends towards the surface of said plate through said locking opening and presents at its end a head comprising at least one transverse locking tooth which projects laterally, said locking opening in said plate comprising at least one recess which permits the passage of said locking tooth, said recess being angularly offset with respect to the position that said locking tooth assumes when the blade is secured to said plate by means of said single locking bolt.

4. An implement according to claim 1, wherein said locking shank and locking opening together form a bayonet joint.

5. An implement according to claim 1 wherein portions of said plate are inclined in a different direction with respect to the axis of said rotatable shaft.

6. An implement according to claim 1, wherein said plate is polygonal and comprises at least two pairs of diametrically opposed angular portions which carry each at least one blade, each portion of said pair being bent in opposite directions with respect to the median portion of the plate.

7. An implement according to claim 1, wherein said plate is polygonal, all of the angle zones of said plate which carry at least one blade being alternately bent into opposite directions with respect to the median portion of the plate.

8. An implement according to claim 1, wherein said plate is polygonal and wherein said blades are secured at the vertexes of said polygonal plate.

9. An implement according to claim 8, wherein blades secured to at least two diametrically opposed vertexes of said plate are secured on opposite sides of said plate.

10. An implement according to claim 8, wherein said blades are secured to said plate by means of a base portion slightly bent with respect to said locking shank, said base portion bearing against a small angle portion on said plate, said small angle portion being correspondingly slightly bent.

11. An implement according to claim 1, comprising plates spaced apart and secured to said rotatable shaft, at least one of the terminal plates secured at the extremities of the shaft being flanked by a reinforcing flange which is secured both to the shaft and to the associated terminal plate, said flange having peripheral recesses corresponding to the locking openings provided in said plate.

* * * * *